SCHMIDLIN & DRISCOLL.

Reflector.

No. 3,981. Reissued May 17, 1870.

WITNESSES

Lemuel W. Serrell

Chas. H. Smith

INVENTORS

Wm. G. Schmidlin

J. W. Driscoll

N. PETERS. Photo-Lithographer, Washington, D. C.

United States Patent Office.

WILLIAM G. SCHMIDLIN AND JEREMIAH W. DRISCOLL, OF NEW YORK, N. Y.

*Letters Patent No.* 32,722, *dated July* 2, 1861; *reissue No.* 3,981, *dated May* 17, 1870.

IMPROVEMENT IN REFLECTORS.

The Schedule referred to in these Letters Patent and making part of the same

*To all whom it may concern:*

Be it known that we, WILLIAM G. SCHMIDLIN and JEREMIAH W. DRISCOLL, of the city, county, and State of New York, have invented a new and useful Improvement in Reflectors for Lamps and Gas; and the following is declared to be a correct description thereof.

Several reflectors have heretofore been constructed, in which flat and corrugated glasses have been introduced in front of flat metallic reflecting-surfaces, and said reflectors have been suspended above lights such as in shop-windows, for the purpose of throwing the rays of light down upon the various articles exhibited, but experience shows that flat reflectors with corrugated flat sheets of glass do not concentrate and give direction to the rays of light in the manner required, particularly for show-windows; that for this purpose curved polygonal reflectors are preferable, and such curved reflectors have heretofore been made exclusively of metal.

The nature of our said invention consists in a polygonal reflector adapted to being placed above the light, and formed of curved metal protected by a lining of glass, the said curved sheet-metal reflector being adapted especially to forming reflectors for store-windows, wherein the surface of the glass divides and softens the reflected rays, and the curved surface gives direction and concentration to the rays of light, so that they fall upon articles with greater uniformity and intensity.

In the drawing—

Figure 1:
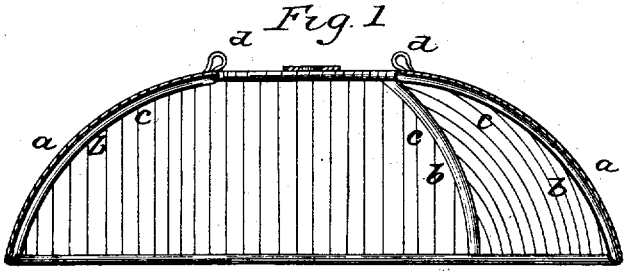
Figure 1 is a section of our reflector.
Figure 2:
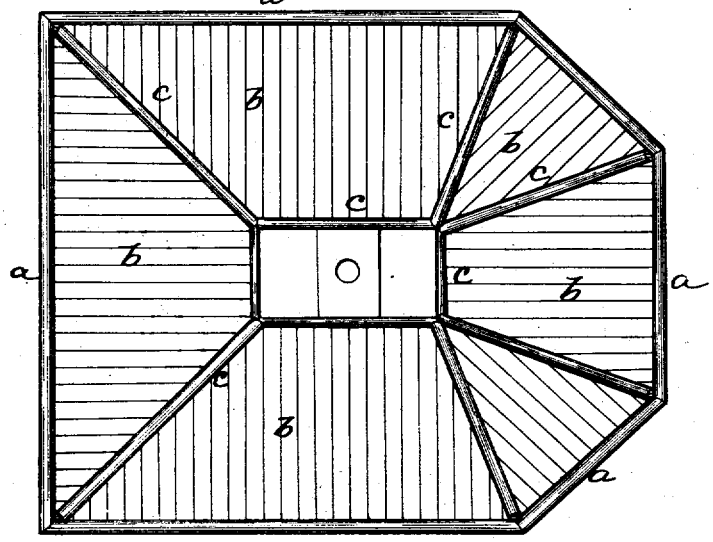
Figure 2 is a face view of the same.

*a a* represent the sections of a reflector made out of metal or other reflecting material, and curved as represented, said sections being put together in a polygonal form, as shown.

We take sheets of glass of an undulating, corrugated, or wavy surface, or as ordinarily made in flat sheets, and we provide a mold of any suitable material, being the section of a cylinder corresponding to the curve of the reflector sections *a*.

Upon this mold we lay the sheets of plain or corrugated glass, and heat the same just sufficiently to bend to the shape of the mold.

These curved and corrugated glasses are then cut out to the shape of the reflector sections *a*, and introduced, as shown at *b b*, and *c c* are metallic beads or ribs, by which the curved corrugated glasses are secured in place.

We find, practically, that reflectors made in this manner not only give greater uniformity in the reflection of the light, but the glasses are less liable to be broken from expansion and contraction, or in handling.

Eyes may be provided as at *d d*, by which to attach the reflector. The curved metallic sections of the reflector might be corrugated, but we prefer that the curved sections of glass be corrugated and the metal plain.

The glass becomes a protection to the polished metallic surface, to lessen the atmospheric influences upon the same.

A reflector with a lining of glass is not claimed broadly, but the polygonal reflector formed of sections of curved metal, protected by a lining of glass, forming the first element of our invention, and the corrugated bent glass lining for a reflector forming the second element of our invention, it will be evident that these elementary features may be employed either jointly or separately in reflectors.

We claim as our invention—

1. A reflector made of curved sections of sheet metal united together to form a polygonal reflector, and protected by a lining of glass, substantially as specified.

2. A lining for metallic reflector formed of plates of corrugated glass bent into the form of a segment of a cylinder, substantially as specified.

Signed by us this 29th day of March, A. D. 1870.

WM. G. SCHMIDLIN.
J. W. DRISCOLL.

Witnesses:
CHAS. H. SMITH,
GEO. T. PINCKNEY.